United States Patent [19]

John, Jr.

[11] Patent Number: 4,727,783
[45] Date of Patent: Mar. 1, 1988

[54] FLYING CUTOFF APPARATUS

[75] Inventor: Clarence D. John, Jr., Penn Hills Township, Allegheny County, Pa.

[73] Assignee: Westinghouse Electric Corp., Pittsburgh, Pa.

[21] Appl. No.: 875,156

[22] Filed: Jun. 17, 1986

[51] Int. Cl.⁴ .............................................. B23B 37/00
[52] U.S. Cl. ..................................... 82/53.1; 82/90; 82/92; 82/94; 82/97; 83/308; 83/320
[58] Field of Search ...................... 82/53.1, 90, 92, 94, 82/95, 96, 97, 101, 102, 38; 83/308, 320

[56] References Cited

U.S. PATENT DOCUMENTS

| | | |
|---|---|---|
| 420,103 | 1/1890 | Roberts . |
| 1,269,635 | 6/1918 | Neuman . |
| 1,625,850 | 4/1927 | Gedien et al. . |
| 1,643,994 | 10/1927 | Parsons ............................. 82/53.1 X |
| 2,168,203 | 8/1939 | Green ................................. 83/308 X |
| 3,051,061 | 8/1962 | Baxter et al. .................... 82/53.1 X |
| 3,076,641 | 2/1963 | Fullerton et al. ....................... 266/23 |
| 3,173,318 | 3/1965 | Lindemann ...................... 82/53.1 X |
| 3,211,059 | 10/1965 | Linsinger ......................... 82/53.1 X |
| 3,224,310 | 12/1965 | Bieri ...................................... 83/157 |
| 3,527,129 | 9/1970 | Schesser ................................. 83/287 |
| 3,662,999 | 5/1972 | Meyer ................................. 266/23 N |
| 3,717,058 | 2/1973 | McMinn ................................. 83/157 |
| 3,886,832 | 6/1975 | Harris ..................................... 83/308 |
| 3,948,131 | 4/1976 | Yatsenko et al. ...................... 83/308 |
| 4,074,895 | 2/1978 | Capriotti ................................. 266/50 |
| 4,238,663 | 12/1980 | Calhoun et al. .................. 219/121 P |
| 4,299,147 | 11/1981 | Rogers ............................... 82/53.1 X |
| 4,303,227 | 12/1981 | Dompas ................................. 266/69 |
| 4,393,296 | 7/1983 | Dompas ................................. 219/121 |
| 4,542,670 | 9/1985 | Borzym .................................. 83/295 |

FOREIGN PATENT DOCUMENTS 220456 8/1961 Austria ................................. 82/53.1

Primary Examiner—Paul A. Bell
Assistant Examiner—Scott A. Smith

[57] ABSTRACT

A flying cutoff apparatus for cutting longitudinally moving and axially rotating tubing includes a track positioned along and generally parallel to the direction of longitudinal movement of the tubing, a carriage mounted on the track adjacent to the tubing for movement along the track, a cutter mechanism mounted on the carriage adjacent the tubing and stationary relative to axial rotation thereof, and an actuator, such as a hydraulic cylinder, mounted on the carriage for moving the cutter mechanism relative to the carriage and between non-cutting and cutting positions. The cutter mechanism also is mounted on the carriage for movement with the carriage and relative thereto in transverse relation to the direction of longitudinal movement of the tubing between a non-cutting position wherein the cutter mechanism is disengaged from the tubing and a cutting position wherein the cutter mechanism clamps and thereby moves with the tubing as the same moves longitudinally and operates concurrently to cut the tubing as the same rotates relative to the cutter mechanism. The cutter mechanism includes a cutting roll disposed on one side of the moving tubing and a pair of backing rolls disposed on an opposite side thereof which clamp the tubing therebetween when the cutter mechanism is in its cutting position. The movement of the carriage and cutter mechanism with the moving tubing is due solely to the cutter mechanism clamping the tubing when in its cutting position.

16 Claims, 6 Drawing Figures

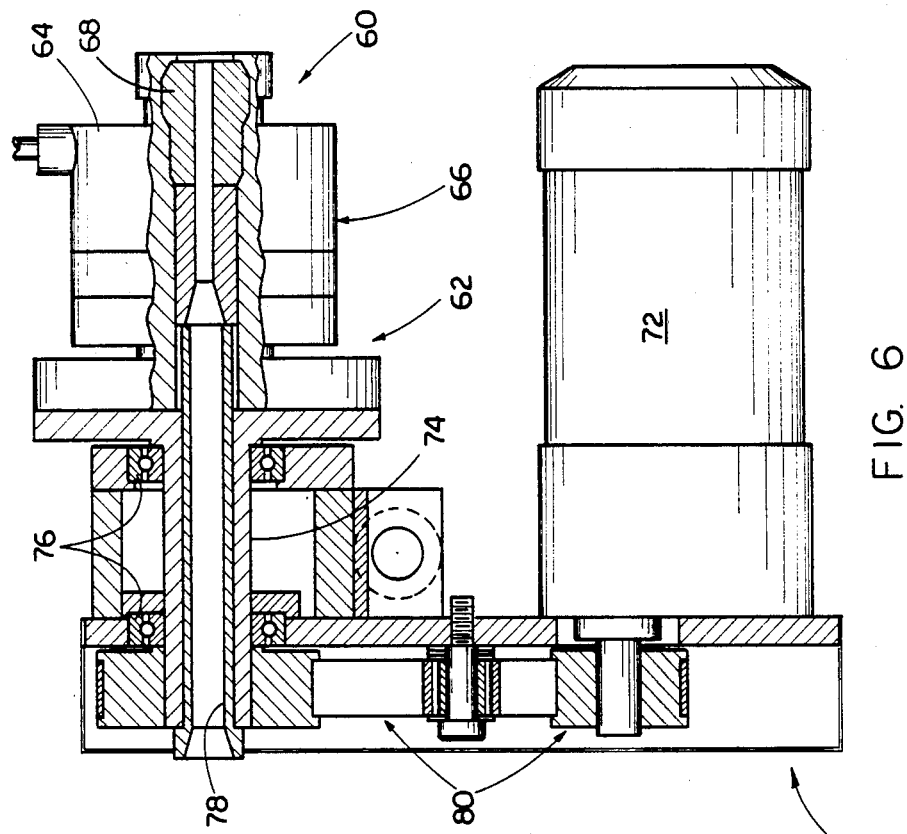
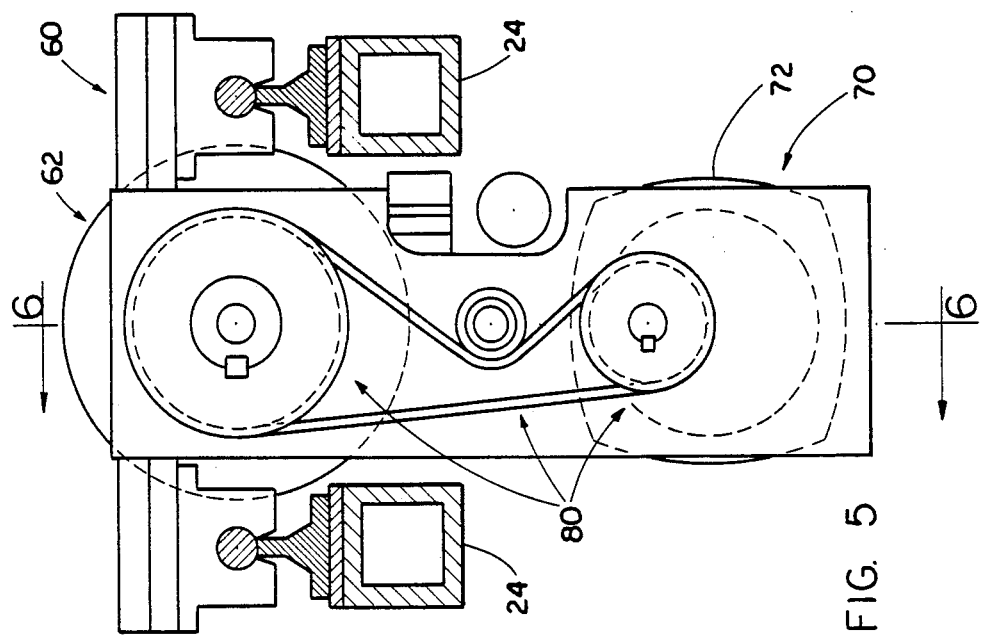
FIG. 6
FIG. 5

FLYING CUTOFF APPARATUS

BACKGROUND OF THE INVENTION

1. Field of the Invention

The present invention relates generally to the manufacture of metal tubing for use in nuclear fuel assemblies and, more particularly, is concerned with a flying cutoff apparatus employing a cutter mechanism capable of clamping to and riding with longitudinally moving and axially rotating tubing for cutting the same to desired lengths without requiring separate components to clamp to or move the cutter mechanism with the moving and rotating tubing.

2. Description of the Prior Art

One conventional technique for manufacturing zirconium tubing for nuclear fuel assemblies involves pilgering a length of stock tubing to produce an approximately sixty-foot section having precise dimensions. Then, the section of tubing is removed from the pilgering mill and cut into twelve-foot lengths, which is the required length for use in nuclear fuel assemblies. The interim step of removing the sixty-foot sections of tubing before cutting requires additional routing and handling and greater area which is an inefficient use of labor and floor space.

Various approaches are proposed in the prior art for cutting pipe or tube to desired lengths upon emerging from a forming machine. Representative of the prior art approaches are the apparatuses disclosed in U.S. Patents to Neuman (U.S. Pat. No. 1,269,635), Gedien et al (U.S. Pat. No. 1,625,850), Fullerton et al (U.S. Pat. No. 3,076,641), Bieri (U.S. Pat. No. 3,224,310), Miyazaki (U.S. Pat. No. 3,596,549), Meyer (U.S. Pat. No. 3,662,999), McMinn (U.S. Pat. No. 3,717,058), Harris (U.S. Pat. No. 3,886,832) and Borzym (U.S. Pat. No. 4,542,670). While these apparatuses undoubtedly operate satisfactorily under the range of conditions for which they were designed, all appear to incorporate at least one of the following disadvantages. Some require independent means for moving the severing mechanism with the moving pipe or tube. Others have means separate from the severing mechanism for clamping the latter to the moving pipe or tube. Still others must be rotated to sever the pipe or tube, while others use severing techniques not appropriate for use in cutting fuel assembly tubing.

Consequently, a need still exists for a fresh approach to cutting desired tubing lengths from a moving longer section of tubing as it emerges from a forming machine, which approach will eliminate the drawbacks of these prior approaches without creating new limitations.

SUMMARY OF THE INVENTION

The present invention provides a flying cutoff apparatus designed to satisfy the aforementioned needs. The apparatus of the present invention has a hydraulically activated tube cutter mechanism that is indexed on a longitudinally moving and axially rotating tubing such that predetermined lengths thereof, for instance twelve-foot lengths, can be cut as soon as the tubing exits a tube forming machine, such as a pilgering mill. The cutter mechanism rides the tubing as it is expelled from the mill and utilizes the rotation imparted by the mill to the tubing to cut it. This approach results in a more efficient use of floor space than before and automates a previously manual operation. In addition, the cutter mechanism requires no additional components in the apparatus to drive it with the moving tubing nor to clamp it to the tubing. The cutter mechanism uses the movement of the tubing by riding on it and only the cutting and backing rolls of the cutter mechanism clamp the mechanism to the tubing. Also, the apparatus includes an auxiliary mechanism for rotating the last portion of the tubing section once it has left the pilgering mill.

Accordingly, the present invention is directed to a flying cutoff apparatus for cutting longitudinally moving and axially rotating tubing, which comprises: (a) a track positioned along the direction of longitudinal movement of the tubing; (b) a carriage mounted on the track adjacent to the tubing for movement along the track in the direction of longitudinal movement of the tubing; (c) a cutter mechanism mounted on the carriage adjacent the tubing and stationary relative to axial rotation thereof, the cutter mechanism also being mounted on the carriage for movement with the carriage and relative thereto in transverse relation to the direction of longitudinal movement of the tubing between a non-cutting position wherein the cutter mechanism is disengaged from the tubing and a cutting position wherein the cutter mechanism clamps and thereby moves with the tubing as the same moves longitudinally and operates concurrently to cut the tubing as the same rotates relative to the cutter mechanism; and (d) means mounted on the carriage for moving the cutter mechanism relative to the carriage and between its non-cutting and cutting positions. The movement of the carriage and cutter mechanism with the moving tubing is due solely to the cutter mechanism clamping the tubing when in its cutting position.

More particularly, the track extends generally parallel to the direction of longitudinal movement of the tubing such that the carriage is movable generally parallel to the direction of tubing movement. Also, the cutter mechanism includes a cutting device in the form of a cutting roll rotatably mounted on the carriage and disposed on one side of the moving tubing, and a backing device in the form of a pair of backing rolls rotatably mounted on the carriage and disposed on an opposite side of the moving tubing. At least one of the cutting roll and backing rolls are movable relative to the other when the cutter mechanism is moved between its non-cutting and cutting positions. The cutter mechanism also includes an adjustable device for presetting the position of the cutting roll relative to the backing rolls, and the means for moving the cutter mechanism relative to the carriage is a hydraulic cylinder coupled to the backing rolls.

The present invention is also set forth in a tube manufacturing station, wherein the combination comprises: (a) means for progressively forming a section of tubing of a given length in which the tubing section is longitudinally moving and axially rotating as it emerges from the forming means; (b) means for cutting tubes of lengths shorter than the given length from the tubing section concurrently as the same emerges from the forming means; and (c) means for gripping and rotating the tubing section as a final portion thereof finally exits the forming means for permitting the cutting means to cut a last one of the tubes from the remaining portion of the tubing section.

More particularly, the cutting means includes a cutter mechanism capable of clamping to and thereby moving with the tubing as the same moves longitudinally and operating concurrently to cut the tubing as the same rotates axially. The cutter mechanism includes a cutting device disposed on one side of the moving tubing and a backing device disposed on an opposite side thereof. The cutting and backing devices are capable of clamping the moving tube therebetween such that movement of the cutter mechanism with the moving tubing as the cutter mechanism cuts the tubing is due solely to the cutter mechanism clamping the tubing. The gripping and rotating means includes a rotary jaw for receiving the tubing section and being actuatable between tubing section gripping and non-gripping positions. It also includes means for actuating the jaw between its gripping and non-gripping positions and drive means coupled to the jaw for rotating the same in order to rotate the tubing section when the jaw is actuated to its gripping position. The rotary jaw includes a chuck mechanism having collets for gripping the tubing section when the jaw is in its gripping position, and the actuating means includes compressed air driven members for causing the collets to grip the tubing section.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 5 is an enlarged end elevational view of the auxiliary tubing rotating mechanism of the cutoff apparatus as seen along line 5—5 of FIG. 1.

FIG. 6 is a side elevational view, partly in section, of the auxiliary mechanism of the cutoff apparatus as taken along line 6—6 of FIG. 5.

DETAILED DESCRIPTION OF THE INVENTION

Figure 1:
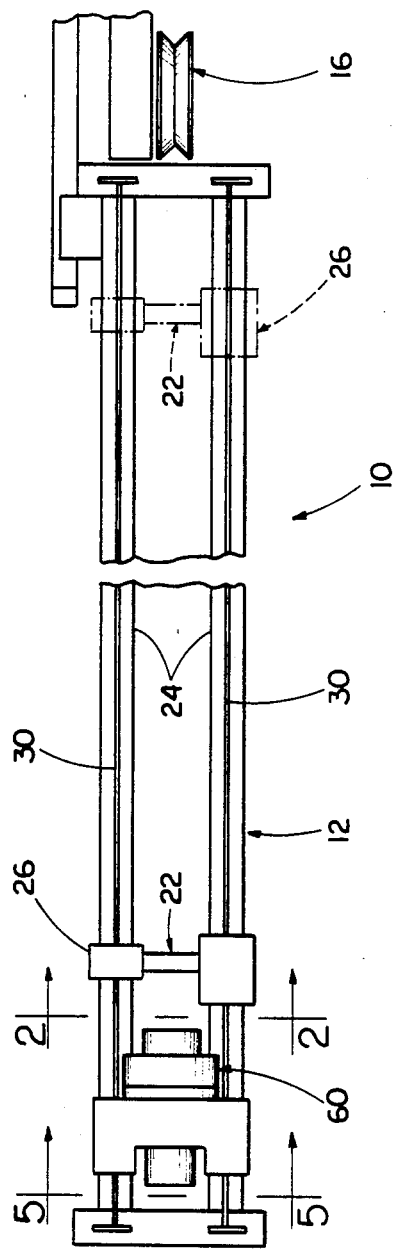
FIG. 1 is a top plan view of the flying cutoff apparatus of the present invention, illustrating the apparatus positioned downstream of the exit end of a pilgering mill.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Referring now to the drawings, and particularly to FIG. 1, there is shown a station 10 of a nuclear fuel tube manufacturing operation in which the flying cutoff apparatus 12 of the present invention is employed. The station 10 extends from an exit end of a pilgering mill 14 located upstream of the cutoff apparatus 12 to an entrance end of a tube receiving station 16 located downstream of the apparatus. As conventionally known in the art, the pilgering mill 14 progressively forms a section of tubing 18 (FIG. 4), for example, of a length somewhat greater than sixty feet, which moves longitudinally and rotates axially as it emerges from the discharge end 20 of the mill 14. The cutoff apparatus 12 has a cutter mechanism 22, to be described in detail below, which cuts a number of tubes of shorter lengths, for instance five tubes of twelve feet lengths in the case of fuel rods used in nuclear fuel assemblies, from the tubing section 18 concurrently as the same emerges from the pilgering mill 14.

Figure 3:
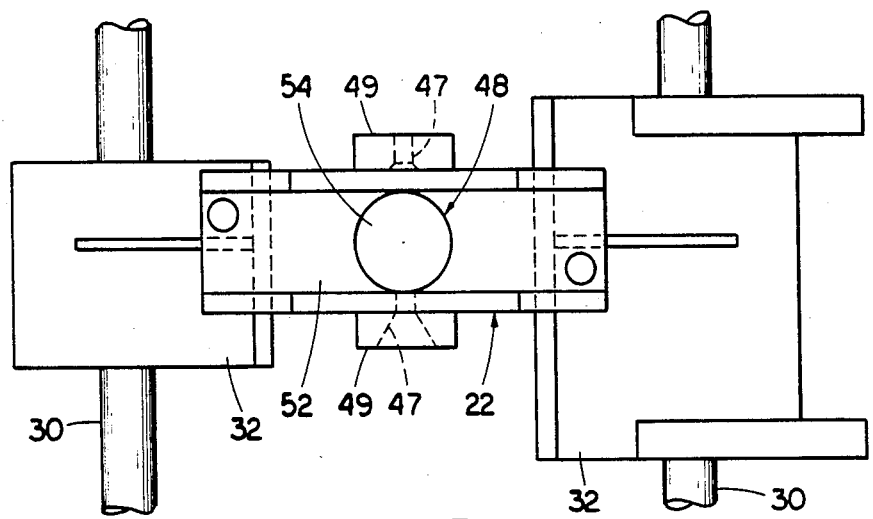
FIG. 3 is a top plan view of the cutter mechanism of the cutoff apparatus as seen along line 3—3 of FIG. 2.
Figure 2:
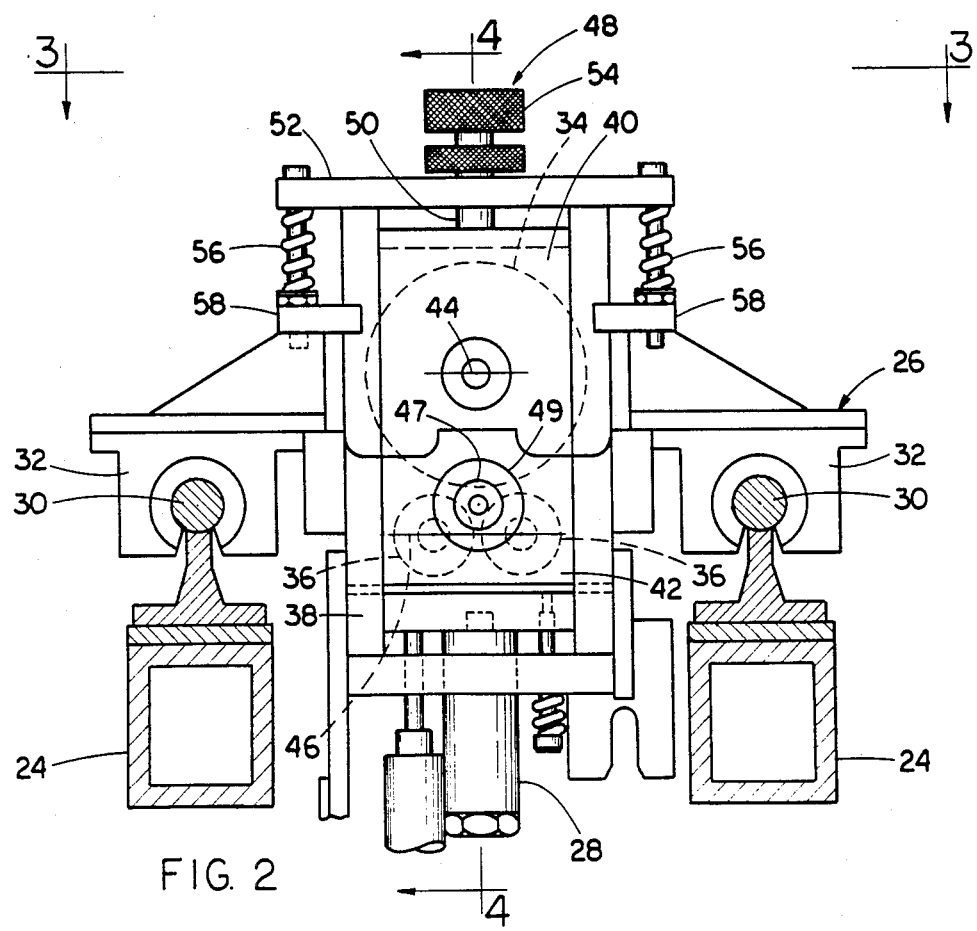
FIG. 2 is an enlarged and elevational view of the cutter mechanism of the cutoff apparatus as seen along line 2—2 of FIG. 1.
Figure 4:
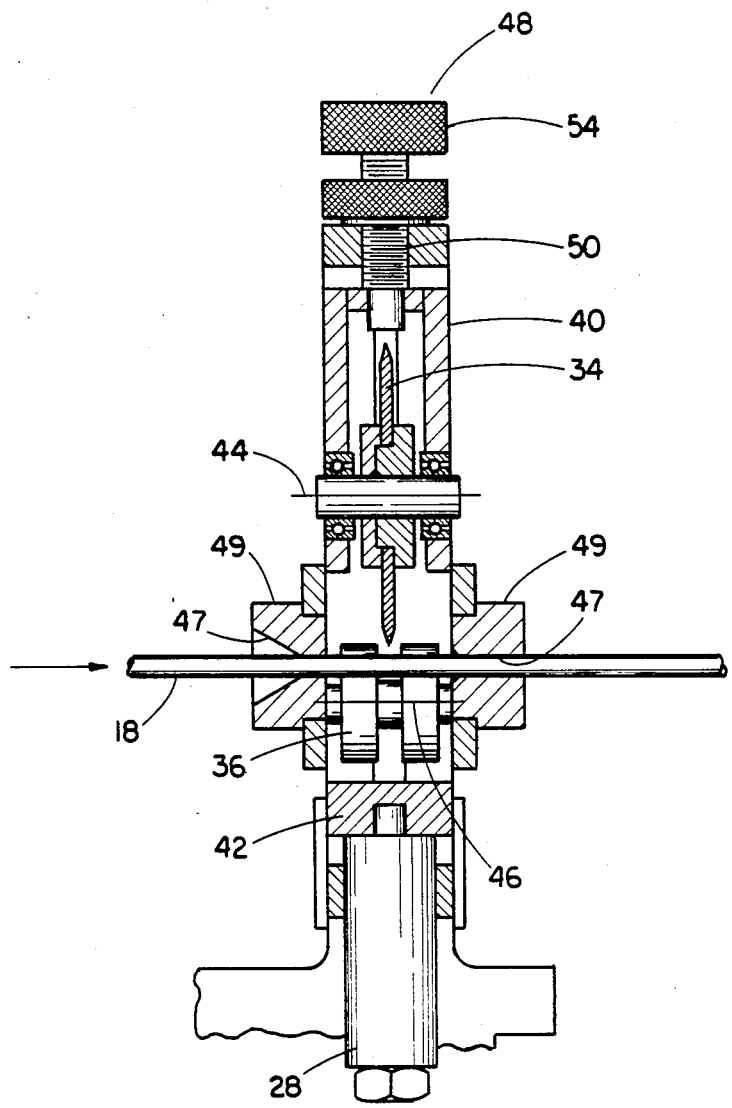
FIG. 4 is a side elevational view, partly in section, of the cutter mechanism of the cutoff apparatus as taken along line 4—4 of FIG. 2.

As seen in FIG. 1 and in greater detail in FIGS. 2 to 4, for cutting the longitudinally moving and axially rotating tubing section 18, the cutoff apparatus 12 generally includes a track 24, a carriage 26 and means in the form of an actuator 28, such as a hydraulic cylinder, in addition to the cutter mechanism 22. The track 24 is in the form of a pair of laterally spaced apart guide rails 30 positioned along, below and generally parallel to the direction of longitudinal movement of the tubing section 18 from the exit end of the pilgering mill 14. The carriage 26 has a pair of lateral bearings 32 by which it is mounted on the guide rails 30 of the track 24 adjacent to the tubing section 18 for movement along the track in the direction of longitudinal movement of the tubing section.

The cutter mechanism 22 is mounted on the carriage 26 generally adjacent to and across the path of the moving tubing section 18 but disposed generally stationary relative to rotational motion of the tubing section. The cutter mechanism 22 is also mounted on the carriage 26 for movement with it as well as relative to it and in transverse relation to the direction of longitudinal movement of the tubing section 18 between non-cutting and cutting positions.

Preferably, the cutter mechanism 22 includes a cutting device in the form of a cutting roll 34 disposed above the moving tubing and a backing device in the form of a pair of backing rolls 36 disposed below the tubing. The carriage 26 also includes a vertical guide channel 38 located between the bearings 32 with upper and lower guides 40, 42 slidably mounted in the channel. The cutting roll 34 is mounted to the upper guide 40 for rotation about a horizontal axis 44, whereas the backing rolls 36 are mounted to the lower guide 42 in side-by-side relation to one another below the cutting roll 34 and for rotation about horizontal axes 46 extending parallel to each other and to the axis 44 of the cutting roll 34. All of the horizontal rotational axes 44, 46 of the respective rolls 34, 36 extend generally parallel to the direction of longitudinal movement (see arrow in FIG. 4) of the tubing section 18. The tubing section 18 travels through openings 47 defined in front and rear guides 49 of the carriage 26.

When cutter mechanism 22 is moved within the guide channel 38 relative to the carriage 26 and transversely to the tubing section 18 between its non-cutting and cutting positions, the lower guide 42 and backing rolls 36 are moved away from and toward the upper guide 40 and cutting roll 34 as well as the tubing section 18. The actuator in the form of the hydraulic cylinder 28 is mounted on the carriage 26 and coupled to the lower guide 42 for moving the lower backing rolls 36 away from and toward the upper cutting roll 34 and the tubing section 18. In the non-cutting position of the cutter mechanism 22, the backing rolls 36 are lowered by retraction of the hydraulic cylinder 28 and disengaged from the tubing section 18 such that neither the cutting roll 34 nor the backing rolls 36 contact the moving tubing section. In the cutting position of the cutter mechanism 22, the backing rolls 36 are raised by extension of the hydraulic cylinder 28 and brought into engagement with the moving tubing section 18 sufficiently to lift it slightly and forcibly maintain it in contact with the cutting roll 34.

Consequently, in the cutting position, the cutting and backing rolls 34, 36 of the cutter mechanism 22 coact to clamp onto and thereby move or ride with the tubing 18 as the latter moves longitudinally and the stationary cutting roll 34 operates concurrently to cut the tubing as the latter rotates relative to cutter mechanism. The cutting and backing rolls 34, 36 rotate with the tubing section as they clamp it between them. From the above description, it is readily understood that the movement of the carriage 26 and the cutter mechanism 22 with the moving tubing section 18 is due solely to the rolls 34, 36 of the cutter mechanism 22 clamping the tubing section when in their cutting position. No other components are provided in the cutoff apparatus 12 to serve to perform this function.

In addition, the cutter mechanism 22 includes an adjustable device 48 for presetting the vertical position of the cutting roll 34 relative to the backing rolls 36. The adjustable device 48 includes a shaft 50 threaded through a transverse-extending plate 52 of the carriage 26 and having a knob 54 attached on its upper end for manually rotating the shaft to thread it into or unthread it from the plate. The lower end of the shaft 50 is connected to the upper guide 40 which rotatably mounts the cutting roll 34. Thus, as the vertical position of the shaft 50 is threadably adjusted with respect to the plate 52, the vertical positions of the upper guide 40 and cutting roll 34 are changed with respect to the lower guide 42 and backing rolls 36.

Also, a pair of coiled springs 56 are located on opposite sides of the guide channel 38 of the carriage 26. The springs 56 are disposed in compressed condition between lower ledges 58 on the carriage 26 and the outer opposite ends of the carriage plate 52. The function of the springs 56 is to assist the cylinder 28 in lowering or retracting the backing rolls 36 away from the cutting roll 34 to the non-cutting position of the cutter mechanism 22.

Finally, as seen in FIG. 1 and in detail in FIGS. 5 and 6, an auxiliary mechanism, generally designated 60, is provided for gripping and rotating the tubing section as a last remaining portion thereof finally exits the pilgering mill 14. The auxiliary mechanism 60 permits the cutter mechanism 22 to cut the last one of the tubes from the remaining portion of the tubing section fabricated by the mill 14. The auxiliary gripping and rotating mechanism 60 includes a rotary jaw 62 which receives the tubing section and is actuatable between gripping and non-gripping positions. Means in the form of compressed air driven members 64 are provided for actuating the jaw 62 between its gripping and non-gripping positions. More specifically, the rotary jaw 62 includes a chuck mechanism 66 having collets 68 for gripping the tubing section when the jaw is in its gripping position. The compressed air driven members 64 cause the collets 68 to grip the tubing section. Drive means, generally designated 70, is coupled to the jaw 62 for rotating the same in order to rotate the tubing section when the jaw is actuated to its gripping position. The drive means 70 includes a electric motor 72 drivingly interconnected to a shaft portion 74 of the jaw 62 which is rotatably mounted by bearings 76 mounted to the track 24. A bore 78 is defined through the shaft portion 74 for receiving the tubing section therethrough. A belt and pulley arrangement 80 drivingly interconnects the motor 72 and the end of the jaw shaft portion 74.

It is thought that the invention and many of its attendent advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A flying cutoff apparatus for cutting longitudinally moving and axially rotating tubing, comprising:
    (a) a track positioned along the direction of longitudinal movement of the tubing;
    (b) a carriage mounted on said track adjacent to the tubing for movement along said track in the direction of longitudinal movement of the tubing;
    (c) a cutting device and a backing device mounted on said carriage adjacent the tubing and stationary relative to axial rotation thereof, said cutting device and said backing device also being mounted on said carriage for movement with said carriage, said cutting device being disposed on one side of the moving tube and said backing device being disposed on an opposite side of said moving tubing, at least one of said cutting and backing devices also being mounted on said carriage for movement relative thereto and relative to the other in transverse relation to the direction of longitudinal movement of the tubing between a non-cutting position wherein said cutting and backing devices are disengaged from the tubing and a cutting position wherein said cutting and backing devices clamp and thereby move with the tubing as the same moves longitudinally and operate concurrently to cut the tubing as the same rotates relative to said cutting and backing devices, the movement of said carriage and said cutting and backing devices with the moving tubing being due solely to said cutting and backing devices clamping the tubing therebetween when in said cutting position; and
    (d) means mounted on said carriage for moving said one of said cutting and backing devices relative to said carriage and to the other between said non-cutting and cutting positions.

2. The cutoff apparatus as recited in claim 1, wherein said track extends generally parallel to the direction of longitudinal movement of the tubing such that said carriage is movable generally parallel to the direction of tubing movement.

3. The cutoff apparatus as recited in claim 1, wherein said cutting device is a cutting roll rotatably mounted on said carriage.

4. The cutoff apparatus as recited in claim 1, wherein said backing device is a pair of backing rolls rotatably mounted on said carriage.

5. The cutoff apparatus as recited in claim 1, wherein said backing device is movable relative to said cutting device.

6. The cutoff apparatus as recited in claim 5, further comprising:
    an adjustable device coupled to said cutting device and operable for presetting the position of said cutting device relative to said backing device.

7. The cutoff apparatus as recited in claim 5, wherein said means for moving said backing device relative to said carriage and said cutting device is a hydraulic cylinder coupled to said backing device.

8. A flying cutoff apparatus for cutting longitudinally moving and axially rotating tubing, comprising:
   (a) a track positioned along and generally parallel to the direction of longitudinal movement of the tubing;
   (b) a carriage mounted on said track adjacent to the tubing for movement along said track and generally parallel to the direction of longitudinal movement of the tubing;
   (c) a cutting device and a backing device mounted on said carriage adjacent the tubing and stationary relative to axial rotation thereof, said cutting device and backing device also being mounted on said carriage for movement with said carriage, said cutting device being disposed on one side of the moving tubing and said backing device being disposed on an opposite side of the moving tubing, at least one of said cutting and backing devices also being mounted on said carriage for movement relative thereto and relative to the other in transverse relation to the direction of longitudinal movement of the tubing between a non-cutting position wherein said cutting and backing devices are disengaged from the tubing and a cutting position wherein said cutting and backing devices clamp and thereby move with the tubing as the same moves longitudinally and operate concurrently to cut the tubing as the same rotates relative to said cutting and backing devices, the movement of said carriage and cutting and backing devices with the moving tubing being due solely to said cutting and backing devices clamping the tubing therebetween when in said cutting position; and
   (d) means mounted on said carriage for moving said one of said cutting and backing devices relative to said carriage and to the other between said non-cutting and cutting positions.

9. The cutoff apparatus as recited in claim 8, wherein:
   said cutting device is a cutting roll rotatably mounted on said carriage; and
   said backing device is a pair of backing rolls rotatably mounted on said carriage.

10. The cutoff apparatus as recited in claim 9, wherein said backing rolls are movable relative to said cutting roll.

11. The cutoff apparatus as recited in claim 10, further comprising:
   an adjustable device coupled to said cutting roll and operable for presetting the position of said cutting roll relative to said backing rolls.

12. The cutoff apparatus as recited in claim 10, wherein said means for moving said backing rolls relative to said carriage and said cutting roll is a hydraulic cylinder coupled to said backing rolls.

13. In a tube manufacturing station, the combination comprising:
   (a) means for progressively forming a section of tubing of a given length in which said tubing section is longitudinally moving and axially rotating as it emerges from said forming means;
   (b) means located downstream of said forming means for cutting tubes of shorter lengths than said given length from said tubing section concurrently as the same emerges from said forming means; and
   (c) means located downstream of said forming means and upstream of said cutting means for gripping and rotating said tubing section as a final portion thereof finally exits said forming means for permitting said cutting means to cut a last one of said tubes from said final portion of said tubing section.

14. The tube manufacturing station as recited in claim 13, wherein said cutting means includes a cutting device disposed on one side of said moving tubing section and a backing device disposed on an opposite side thereof, said cutting and backing devices being capable of clamping the moving tubing section therebetween and thereby moving with said tubing section as the same moves longitudinally and operate concurrently to cut the tubing section as the same rotates axially, the movement of said cutting and backing devices with the moving tubing section as said cutting and backing devices cut said tubing section being due solely to said cutting and backing devices clamping the tubing section therebetween.

15. In a tube manufacturing station, the combination comprising:
   (a) means for progressively forming a section of tubing of a given length in which said tubing section is longitudinally moving and axially rotating as it emerges from said forming means;
   (b) means for cutting tubes of shorter lengths then said given length from said tubing section concurrently as the same emerges from said forming means; and
   (c) means for gripping and rotating said tubing section as a final portion thereof finally exits said forming means for permitting said cutting means to cut a last one of said tubes from said final portion of said tubing section;
   (d) said gripping and rotating means including
      (i) a rotary jaw for receiving said tubing section and being actuatable between tubing section gripping and non-gripping positions,
      (ii) means for actuating said jaw between its gripping and non-gripping positions, and
      (iii) drive means coupled to said jaw for rotating the same in order to rotate said tubing section when said jaw is actuated to its gripping position.

16. The tube manufacturing station as recited in claim 15, wherein:
   said rotary jaw includes a chuck mechanism having collets for gripping said tubing section when said jaw is in its gripping position; and
   said actuating means includes compressed air driven members for causing said collets to grip said tubing section.

* * * * *